Patented May 29, 1934

1,960,375

UNITED STATES PATENT OFFICE

1,960,375

ANTHRACENE DERIVATIVE

Sebastian Gassner and Wilhelm Meiser, Leverkusen-I. G.-Werk, Germany, assignors to General Aniline Works, Inc., New York, N. Y., a corporation of Delaware No Drawing. Application September 29, 1931, Serial No. 565,927. In Germany October 20, 1930

2 Claims. (Cl. 260—124)

The present invention relates to new anthracene derivatives, more particularly it relates to 2-hydroxyanthracene - 3 - carboxylic acid - arylamides which may represented by the probable general formula:

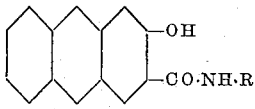

wherein R stands for a benzene or naphthalene nucleus which may be substituted by any substituents with the exception of a group inducing solubility in water, such as the sulfonic acid group or the carboxylic acid group. As substituents coming into consideration there may be mentioned by way of example halogen, alkyl, alkoxy, the nitro group, $-C \equiv N$, a substituted amino group, such as $-NH.CO.alkyl$, $-NH.CO.C_6H_5$, $-NH.alkyl$, $-NH.aryl$, further the carboxylic acid amide and the sulfonic acid amide group.

Our new anthracene derivatives are obtainable by converting the 2-hydroxyanthracene-3-carboxylic acid into the corresponding arylamide by known methods, for example, by heating the same with the corresponding primary amine of the benzene or naphthalene series, in an inert organic solvent, such as toluene, with the addition of phosphorus trichloride.

The new products are generally yellow to orange colored crystalline substances which dissolve in alkali with an orange-red coloration. They are intended to find application as intermediate products in the manufacture of azodyestuffs.

The starting 2-hydroxy-3-carboxylic acid is obtainable in a convenient manner by causing carbon dioxide under pressure to act at an elevated temperature on the alkali metal salts of 2-hydroxyanthracene or on the 2-hydroxycompound in the presence of alkali carbonates.

The invention is illustrated by the following example, without being limited thereto: Example:—The potassium salt of 2-hydroxyanthracene is heated for 9 hours at 260° C. in an atmosphere of carbon dioxide under a pressure of 60 atmospheres. After neutralization the difficultly soluble potassium salt is extracted from the reaction product by means of hot water. On acidification of the filtrate 2-hydroxyanthracene-3-carboxylic acid is precipitated, which in the dry state is a yellowish orange colored powder, crystallizing from glacial acetic acid or dichlorobenzene in rhombic leaflets. The decomposition point is 295° C.

7 parts by weight of 2.3-hydroxyanthracene carboxylic acid, 3.2 parts by weight of o-toluidine and 70 parts by weight of toluene are heated to 70° C. and 2 parts by weight of phosphorus trichloride are dropped in with stirring. The mixture is then heated to boiling until the evolution of hydrochloric acid has ceased. The yellow colored arylide, which separates, is filtered, boiled with sodium carbonate and crystallized from o-dichlorobenzene. The melting point of the o-toluidide is 270° C.

The melting points and shades of some of the arylides of 2.3-hydroxyanthracene carboxylic acid obtainable in accordance with the above example are:

| Base | Shade | Melting point |
|---|---|---|
|  |  | C. |
| Aniline | yellow | 297° |
| o-anisidine | yellow | 231° |
| p-anisidine | yellow | 309° |
| p-methoxy-o-toluidine | yellow | 253° |
| α-naphthylamine | yellow | 293° |
| β-naphthylamine | yellow | 314° |
| m-nitraniline | orange | 280° |
| aminohydroquinonedimethylether | yellow | 252° |
| 5-chloro-2-toluidine | yellow | 282° |

We claim:

1. 2-hydroxyanthracene 3-carboxylic acid arylamides of the probable general formula:

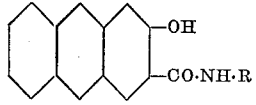

wherein R stands for a benzene or naphthalene nucleus which may be substituted by substituents selected from the group consisting of halogen, alkyl, alkoxy, the nitro group, the nitrile group, the $-NH-CO-alkyl$ group, the $-NH-CO-C_6H_5$ group, the $-NH-alkyl$ group, the $-NH-aryl$ group, the carboxylic acid amide group and the sulfonic acid amide group, being generally yellow to orange colored crystalline substances, dissolving in alkali with an orange-red coloration and being valuable intermediate products in the manufacture of azodyestuffs.

2. 2-hydroxyanthracene-3-carboxylic acid-o-toluidide, being a yellow colored crystalline substance of the melting point 270° C., and being a valuable intermediate product for the manufacture of azodyestuffs.

SEBASTIAN GASSNER.
WILHELM MEISER.